United States Patent
Heiskanen et al.

(10) Patent No.: US 10,577,747 B2
(45) Date of Patent: Mar. 3, 2020

(54) METHOD TO PRODUCE A FILM COMPRISING MICROFIBRILLATED CELLULOSE AND AN AMPHOTERIC POLYMER

(71) Applicant: Stora Enso OYJ, Helsinki (FI)

(72) Inventors: Isto Heiskanen, Imatra (FI); Kaj Backfolk, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 15/754,870

(22) PCT Filed: Sep. 16, 2016

(86) PCT No.: PCT/IB2016/055531
§ 371 (c)(1),
(2) Date: Feb. 23, 2018

(87) PCT Pub. No.: WO2017/046754
PCT Pub. Date: Mar. 23, 2017

(65) Prior Publication Data
US 2018/0245287 A1    Aug. 30, 2018

(30) Foreign Application Priority Data

Sep. 17, 2015    (SE) ..................... 1551195

(51) Int. Cl.
| | |
|---|---|
| *D21H 11/18* | (2006.01) |
| *D21H 21/20* | (2006.01) |
| *D21H 17/32* | (2006.01) |
| *D21H 17/37* | (2006.01) |
| *B32B 27/10* | (2006.01) |
| *D21H 21/10* | (2006.01) |
| *D21H 17/22* | (2006.01) |
| *D21H 17/28* | (2006.01) |
| *D21H 17/24* | (2006.01) |
| *D21H 17/31* | (2006.01) |

(52) U.S. Cl.
CPC ............ *D21H 11/18* (2013.01); *B32B 27/10* (2013.01); *D21H 17/22* (2013.01); *D21H 17/24* (2013.01); *D21H 17/28* (2013.01); *D21H 17/31* (2013.01); *D21H 17/32* (2013.01); *D21H 17/375* (2013.01); *D21H 21/10* (2013.01); *B32B 2250/02* (2013.01); *B32B 2323/043* (2013.01); *B32B 2323/046* (2013.01)

(58) Field of Classification Search
None
See application file for complete search history.

(56) References Cited

U.S. PATENT DOCUMENTS

| | | | |
|---|---|---|---|
| 4,552,670 A | 11/1985 | Lipowski et al. | |
| 2001/0004927 A1 | 6/2001 | Greenwood et al. | |
| 2011/0240240 A1 | 10/2011 | Saastamoinen et al. | |
| 2013/0202870 A1* | 8/2013 | Malmborg ............ | D21H 11/18 428/220 |
| 2013/0209772 A1 | 8/2013 | Sandstrom et al. | |
| 2014/0255688 A1 | 9/2014 | Salminen et al. | |
| 2015/0068973 A1 | 6/2015 | Bessonoff et al. | |

FOREIGN PATENT DOCUMENTS

| | | |
|---|---|---|
| CN | 103025956 A | 4/2013 |
| JP | 2015024537 | 2/2015 |
| WO | 9405596 | 3/1994 |
| WO | 0011267 | 3/2000 |
| WO | 2012035205 | 3/2012 |
| WO | 2014091413 A1 | 6/2014 |
| WO | 2014147295 A1 | 9/2014 |

OTHER PUBLICATIONS

Smook, Gary A., Handbook for Pulp and Paper Technologists, 2nd ed, Angus Wilde Publications, 1992, pp. 324. (Year: 1992).*
International Search Report for PCT/IB2016/055531, dated Nov. 23, 2016.
Kristin Syverud and Per Stenius: "Strength and barrier properties of MFC films", Cellulose, Springer Netherlands, Netherlands, vol. 16, No. 1, Aug. 19, 2008, pp. 75-85.

* cited by examiner

*Primary Examiner* — Dennis R Cordray
(74) *Attorney, Agent, or Firm* — Greer, Burns & Crain Ltd.

(57) ABSTRACT

A method for the production of a film from a fibrous web, wherein the method comprises the steps of: providing a fibrous suspension comprising a microfibrillated cellulose, wherein the content of the microfibrillated cellulose of said suspension is in the range of 60 to 99.9 weight-% based on total dry solid content, adding an amphoteric polymer to said suspension to provide a mixture of said microfibrillated cellulose and said amphoteric polymer, providing said mixture to a substrate to form a fibrous web, wherein the amount of amphoteric polymer in said mixture is in the range of 0.1 to 20 kg/metric ton based on total dry solid content; and dewatering said fibrous web to form a film having a basis weight of less than 40 g/m2 and a density in the range of from 700 to 1000 kg/m3.

19 Claims, No Drawings

METHOD TO PRODUCE A FILM COMPRISING MICROFIBRILLATED CELLULOSE AND AN AMPHOTERIC POLYMER

This application is a U.S. National Stage under 35 U.S.C. § 371 of International Application No. PCT/IB2016/055531, filed Sep. 16, 2016, which claims priority to Swedish Patent application no. 1551195-9, filed Sep. 17, 2015.

TECHNICAL FIELD

The present invention relates to a method of using an amphoteric polymer as an additive when producing a film from a nanofibrous web.

BACKGROUND

The manufacturing of a film from a web comprising microfibrillated cellulose (MFC) on a paper machine is very demanding. Due to a low dewatering speed, there are problems when releasing the material from the wire of the paper machine. There is also a risk that a too strong dewatering may cause pin-holes in the web, which deteriorates the quality of the film. Another critical variable is the formation of the web, which in turn affects the web properties.

Various manufacturing methods have been proposed to make MFC or NFC films such as free standing films by coating NFC on plastic support material like PE, PET, and so on (WO13060934A2)

JP10095803A discloses a method where bacterial nanocellulose (BNC) is sprayed on paper which act as a base substrate. Similar methods, i.e. to use paper or paperboard substrate have been studied and reported quite frequently in the prior art.

US2012298319A teaches a method of manufacturing of MFC film by applying furnish directly on porous substrate thus allowing the MFC to be dewatered and filtered.

WO12107642A1 address the problem with the hygroscopic properties of MFC, which was solved by using organic solvent when preparing the films.

There is thus a need for a method where the dewatering, retention and network structure properties can be controlled and improved when forming a film from a wet web comprising a microfibrillated cellulose.

SUMMARY

It is an object of the present disclosure, to provide an improved method of manufacturing a thin film comprising microfibrillated cellulose, which eliminates or alleviates at least some of the disadvantages of the prior art methods.

The invention is defined by the appended independent claims. Embodiments are set forth in the appended dependent claims and in the following description.

According to a first aspect, there is provided a method for the production of a film from a fibrous web, wherein the method comprises the steps of:

providing a fibrous suspension comprising a microfibrillated cellulose, wherein the content of the microfibrillated cellulose of said suspension is in the range of 60 to 99.9 weight-% based on total dry solid content, adding an amphoteric polymer to said suspension to provide a mixture of said microfibrillated cellulose and said amphoteric polymer, providing said mixture to a substrate to form a fibrous web, wherein the amount of amphoteric polymer in said mixture is in the range of 0.1 to 20 kg/metric ton based on total dry solid content; and dewatering said fibrous web to form a film having a basis weight of less than 40 g/m$^2$ and a density in the range of from 700 to 1600 kg/m$^3$.

By amphoteric is meant that the polymer contain both cationic and anionic (chargeable) groups. The level of charge is determined by degree of substitution, pH and, for example, electrolyte type and concentrations.

By providing a mixture of the microfibrillated cellulose and the amphoteric polymer, there is provided a way of manufacturing a thin and dense film, without the disadvantages normally connected to this type of process. This means that the main challenge, i.e. the dewatering of a suspension comprising high amounts of microfibrillated cellulose can be overcome.

According to one embodiment the production of the film is done in a paper making machine where the substrate is a porous wire on which the fibrous web is formed. According to one embodiment the production speed of said paper making machine may be in the range of 20 to 1200 m/min.

Through the inventive method it is thus possible to form a wet web and/or film on the wire and pick the formed film from the wire at a high production speed, which has previously been considered to be very difficult. At a high production speed it is important to have a fast dewatering, which can be facilitated by vacuum suction, where the films comprising the microfibrillated cellulose may be treated by vacuum under/backside of the wire quite easily by the addition of the amphoteric polymer to the fibrous suspension.

According to one embodiment of the first aspect the fibrous web is preferably formed by adding the mixture, preferably by casting the suspension, onto the substrate. The substrate may be a paper or paperboard substrate thus forming a paperboard or paper substrate coated with a MFC film. The substrate may also be a polymer or metal substrate. The casted fibrous web can then be dried in any conventional manner and thereafter peeled off from the substrate. The peeled off fibrous web is thereafter conducted to a drying equipment to create a dried film.

According to one embodiment of the first aspect the amphoteric polymer may be selected form the group comprising amphoteric polysaccharides and amphoteric hydrocolloids.

The amphoteric polysaccharide or amphoteric hydrocolloid may be amphoteric guar gum.

The amphoteric polymer or hydrocolloid polymer may thus be a bio-based polymer. It has been shown that the addition of amphoteric guar gum to the MFC suspension reduces the adhesion to the papermaking wire and also improves the barrier properties of the film.

According to one embodiment the amount of amphoteric guar gum in the web comprising the microfibrillated cellulose and the guar gum, is in the range of 0.1 to 20 kg/metric ton based on total dry solid content.

According to another embodiment the amphoteric polymer may be an amphoteric protein.

According to yet an embodiment the amphoteric polymer may be an amphoteric starch.

According to one embodiment of the first aspect the microfibrillated cellulose has a Schopper Riegler value (SR°) of more than 90 SR°, or more than 93 SR°, or more than 95 SR°.

This means that a polyethylene can be applied to the film comprising the amphoteric polymer.

According to a second aspect there is provided a film comprising microfibrillated cellulose and an amphoteric polymer, obtained by the method according to the first aspect, wherein said film has a basis weight of less than 40 g/m$^2$ and a density in the range of 700 to 1600 kg/m$^3$.

According to a third aspect there is provided a laminate comprising a film according to the second aspect and a thermoplastic polymer, such as any one of a polyethylene, a polyethylene terephthalate and a polylactic acid.

This laminate structure may provide for even more superior barrier properties.

According to one embodiment of the third aspect the polyethylene may be any one of a high density polyethylene and a low density polyethylene.

According to a fourth embodiment there is provided the film according to the second aspect or the laminate according to the third aspect, wherein said film or said laminate is applied to the surface of any one of a paper product and a board.

DESCRIPTION OF EMBODIMENTS

According to the inventive method a film is formed, by providing a fibrous suspension onto a substrate and dewatering the web to form said film.

According to one embodiment a suspension comprising a microfibrillated cellulose is provided to form said film.

The fibrous content of the fibrous suspension may, according to one embodiment be in the range of from 60 to 99.9 weight-% based on total dry solid content. According to an alternative embodiment the fibrous content may be in the range of 70 to 95 weight-% based on total dry solid content, or in the range of from 75 to 90 weight-% based on total dry solid content.

According to one embodiment the fibrous content is exclusively formed by the microfibrillated cellulose.

Microfibrillated cellulose (MFC) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides, Tappi J.*, March 1970, Vol 53, No. 3), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 200 m2/g, or more preferably 50-200 m2/g when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to hydrolyse or swell fiber or reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxydation, for example "TEMPO"), or quaternary ammonium (cationic cellulose). After being modified or oxidized in one of the above-described methods, it is easier to disintegrate the fibers into MFC or nanofibrillar size or NFC.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated. MFC is produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the new proposed TAPPI standard W13021 on cellulose nanofibril (CNF) defining a cellulose nanofiber material containing multiple elementary fibrils with both crystalline and amorphous regions, having a high aspect ratio with width of 5-30 nm and aspect ratio usually greater than 50.

According to one embodiment the MFC may have a Schopper Riegler value (SR°) of more than 90. According to another embodiment the MFC may have a Schopper Riegler value (SR°) of more than 93. According to yet another embodiment the MFC may have a Schopper Riegler value (SR°) of more than 95. The Schopper-Riegler value can be obtained through the standard method defined in EN ISO 5267-1. This high SR value is determined for a re-pulped wet web, with or without additional chemicals, thus the fibers have not consolidated into a film or started e.g. hornification.

The dry solid content of this kind of web, before disintegrated and measuring SR, is less than 50% (w/w). To determine the Schopper Riegler value it is preferable to take a sample just after the wire section where the wet web consistency is relatively low. The skilled person understands that paper making chemicals, such as retention agents or dewatering agents, have an impact on the SR value.

The SR value specified herein, is to be understood as an indication but not a limitation, to reflect the characteristics of the MFC material itself. However, the sampling point of MFC might also influence the measured SR value. For example, the furnish could be either a fractionated or an unfractionated suspension and these might have different SR values. Therefore, the specified SR values given herein, are thus either a mixture of coarse and fine fractions, or a single fraction comprising an MFC grade providing the desired SR value.

According to another embodiment the fibrous content is formed by a mixture of different types of fibers, such as microfibrillated cellulose, and a smaller amount of other types of fiber, such as short fibers, fine fibers, long fibers etc. By smaller amount is meant around 10% of the total fibrous content in the suspension, i.e. the main part of the fibrous content is a microfibrillated cellulose.

The fibrous suspension may also comprise other additives, such as fillers, pigments, retention chemicals, cross-linkers, optical dyes, fluorescent whitening agents, de-foaming chemicals, etc.

An amphoteric polymer is added to or mixed with the fibrous suspension to form a mixture. The amphoteric polymer may either be added as a dry additive or as a suspension.

According to one embodiment the amount of amphoteric polymer in the mixture may be in the range of from 0.1 kg to 20 kg amphoteric polymer/metric ton based on total dry solid content. According to another embodiment the amount of amphoteric polymer in the mixture may be in the range of from 0.1 kg to 10 kg amphoteric polymer/metric ton based on total dry solid content.

The amphoteric polymer or the polyelectrolyte may be an amphoteric polysaccharide.

According to one embodiment the amphoteric polymer is a guar gum, which is also an amphoteric hydrocolloid.

According to another embodiment the amphoteric polymer may be any one of an amphoteric hydrocolloid, such as scleroglucan, alginate, carrageenans, pectins, xanthan, hemicelluloses and amphoteric glucomannan, such as galactoglucomannan, etc. The hydrocolloid grade may be of both technical and high purity.

The ampoteric properties can be either naturally derived or achieved by chemical modification by adsorbing e.g. multivalent metal salts or polyelectrolytes.

According to an alternative embodiment the amphoteric polymer may be a polymer or a starch.

According to one embodiment the amount of guar gum added to the suspension is in the range of from 0.1 to 20 kg/metric ton based on total dry solid content. According to one embodiment the amount of guar gum in the mixture may be in the range of from 0.1 kg to 10 kg guar gum/metric ton based on total dry solid content.

The mixture of the microfibrillated cellulose and the amphoteric polymer is then provided onto a substrate to form a wet web.

The substrate may be a porous wire of a paper making machine.

The paper making machine may be any conventional type of machine known to the skilled person used for the production of paper, paperboard, tissue or similar products.

According to one embodiment the production speed of the paper making machine may be in the range of 30 to 1200 m/min.

The substrate may be a paper or paperboard substrate onto which the web is formed. The substrate may also be a polymer or metal substrate.

Subsequent to the wet web being placed onto the substrate, it is dewatered to form a film.

The dewatering may, according to one embodiment be performed by vacuum, hot air, hot calenders etc.

According to one embodiment the wet web is dewatered by vacuum, i.e. water, and other liquids, is sucked from the web when it is placed on the substrate. This is facilitated by the presence of the amphoteric polymer, such as amphoteric guar gum, in the web, and thus allows for high production speeds.

According to one embodiment the basis weight of the film is in the range of from 10 to 40 $g/m^2$. According to an alternative embodiment the basis weight of the film is in the range of from 12 to 35 $g/m^2$ According to one embodiment the density of the film is in the range of from 700 to 1600 $g/m^3$. According to one alternative embodiment the density of the film is in the range of from 700 to 1400 $g/m^3$. According to yet one alternative embodiment the density of the film is in the range of from 700 to 1200 $g/m^3$. According to one embodiment the density of the film is in the range of from 800 to 920 $g/m^3$.

The density of the film may vary depending on several factors; one of them is the filler content. If the filler content is in the range of 10-20% the density of the film may be in the upper part of the range, i.e. around 1400-1600 $kg/m^3$.

According to one embodiment, for a film having a grammage of 30 gsm and at a relative humidity of 50%, the film may have an oxygen transmission rate (OTR) below 30 $cc/m^2/24$ h, or below 10 $cc/m^2/24$ h, or below 5 $cc/m^2/24$ h measured according to the standard ASTM D-3985.

According to one embodiment the film comprising the microfibrillated cellulose and the amphoteric polymer may be laminated to or with a thermoplastic polymer. The thermoplastic polymer may be any one of a polyethylene (PE), a polyethylene terephthalate (PET) and a polylactic acid (PLA). The polyethylene may be any one of a high density polyethylene (HDPE) and a low density polyethylene (LDPE), or various combinations thereof. By using for instance PLA as the thermoplastic polymer the product may be formed completely from biodegradable materials.

The film or the laminate may also be applied to other paper products, such as food containers, paper sheets, paper boards or boards or other structures that need to be protected by a barrier film.

Example

Three different tests were done, two tests on addition of a cationic polymer and one test with addition of an amphoteric polymer in accordance to the present invention.

Test 1

Cationic polyacrylamide (C-PAM) in an amount of 500 g/ton based on total dry solid content was added to a fibrous suspension comprising 100 weight-% based on total fiber content of MFC. The suspension was thereafter conducted to a porous wire forming a fibrous web which thereafter was dewatered to form a film. The film had a grammage of 30 gsm.

The addition of the cationic polymer made the fibrous web to stick to the wire so it was not possible to dry the formed web and to produce a film with barrier properties.

Test 2

Cationic-polyacrylamide (C-PAM) in an amount of 375 g/ton based on total dry solid content was added to a fibrous suspension comprising 100 weight-% based on total fiber content of MFC. The suspension was thereafter conducted to a porous wire forming a fibrous web which thereafter was dewatered to form a film. The film had a grammage of 30 gsm.

The fibrous web was not sticking to the wire at this lower dosage of the cationic polymer. However, the retention of the suspension was quite poor at a level of 89.9% after dewatering. Also, it was not possible to measure the barrier properties in form of OTR value of the film since it was too high to measure.

Test 3

Guar gum in an amount of 1 kg/ton based on total dry solid content was added to a fibrous suspension comprising 100 weight-% based on total fiber content of MFC. The suspension was thereafter conducted to a porous wire forming a fibrous web which thereafter was dewatered to form a film. The film had a grammage of 30 gsm.

The fibrous web comprising guar gum was not sticking to the wire which lead to that the runnability during the test was very good. The retention of the suspension on the wire after drying was also improved to a level of 98.7% and the formed film showed very good barrier properties having a OTR value of 8 cc/m$^2$/24 h measured according to ASTM D-3985.

In view of the above detailed description of the present invention, other modifications and variations will become apparent to those skilled in the art. However, it should be apparent that such other modifications and variations may be effected without departing from the spirit and scope of the invention.

The invention claimed is:

1. A method for the production of a film from a fibrous web, wherein the method comprises the steps of:
   providing a fibrous suspension comprising a microfibrillated cellulose, wherein the content of the microfibrillated cellulose of said suspension is in the range of 60 to 99.9 weight-% based on total dry solid content,
   adding an amphoteric polymer to said suspension to provide a mixture of said microfibrillated cellulose and said amphoteric polymer, wherein the amphoteric polymer is amphoteric guar gum;
   providing said mixture to a substrate to form a fibrous web, wherein the amount of amphoteric polymer in said mixture is in the range of 0.1 to 20 kg/metric ton based on total dry solid content; and
   dewatering said fibrous web to form a film having a basis weight of less than 40 g/m$^2$ and a density in the range of from 700 to 1000 kg/m$^3$.

2. The method as claimed in claim 1 wherein the production of the film is done in a paper making machine where the substrate is a porous wire on which the mixture forms a fibrous web.

3. The method as claimed in claim 2, wherein the production speed of said paper making machine is in the range of 20 to 1200 m/min.

4. The method as claimed in claim 1 wherein the substrate is a paper, a paperboard, a polymer or a metal substrate.

5. The method as claimed in claim 1, wherein the content of said guar gum in the web, comprising the microfibrillated cellulose and the guar gum, is in the range of 0.1 to 20 kg/metric ton based on total dry solid content.

6. The method as claimed in claim 1, wherein the amphoteric polymer is an amphoteric protein.

7. The method as claimed in claim 1, wherein the amphoteric polymer is amphoteric starch.

8. The method as claimed in claim 1, wherein the microfibrillated cellulose has a Schopper Riegler value (SR°) of more than 90 SR°.

9. The method as claimed in claim 1, wherein the microfibrillated cellulose has a Schopper Riegler value (SR°) of more 93 SR°.

10. The method as claimed in claim 1, wherein the microfibrillated cellulose has a Schopper Riegler value (SR°) of more than 95 SR°.

11. A film comprising microfibrillated cellulose and an amphoteric polymer, obtained by the method as claimed in claim 1, wherein said film has a basis weight of less than 40 g/m$^2$ and a density in the range of 700 to 1000 kg/m$^3$, wherein the amphoteric polymer is amphoteric guar gum.

12. A laminate comprising a film as claimed in claim 11, and a thermoplastic polymer.

13. The laminate as claimed in claim 12, wherein the thermoplastic polymer is a high density polyethylene.

14. The method of claim 12, wherein the thermoplastic polymer is a polyethylene, a polyethylene terephthalate or a polylactic acid.

15. The laminate as claimed in claim 12, wherein the thermoplastic polymer is a low density polyethylene.

16. A paper or board product comprising the laminate as claimed in claim 12, wherein said laminate is applied to the surface of any one of the paper or board product.

17. A paper or board product comprising the film as claimed in claim 11, wherein said film is applied to the surface of any one of the paper or board product.

18. A method for the production of a film from a fibrous web, wherein the method comprises the steps of:
    providing a fibrous suspension comprising a microfibrillated cellulose, wherein the content of the microfibrillated cellulose of said suspension is in the range of 60 to 99.9 weight-% based on total dry solid content;
    adding an amphoteric polymer to said suspension to provide a mixture of said microfibrillated cellulose and said amphoteric polymer, wherein the amphoteric polymer is an amphoteric protein;
    providing said mixture to a substrate to form a fibrous web, wherein the amount of amphoteric polymer in said mixture is in the range of 0.1 to 20 kg/metric ton based on total dry solid content; and
    dewatering said fibrous web to form a film having a basis weight of less than 40 g/m$^2$ and a density in the range of from 700 to 1000 kg/m$^3$.

19. A method for the production of a film from a fibrous web, wherein the method comprises the steps of:
    providing a fibrous suspension comprising a microfibrillated cellulose, wherein the content of the microfibrillated cellulose of said suspension is in the range of 60 to 99.9 weight-% based on total dry solid content;
    adding an amphoteric polymer to said suspension to provide a mixture of said microfibrillated cellulose and said amphoteric polymer, wherein the amphoteric polymer is amphoteric starch;
    providing said mixture to a substrate to form a fibrous web, wherein the amount of amphoteric polymer in said mixture is in the range of 0.1 to 20 kg/metric ton based on total dry solid content; and
    dewatering said fibrous web to form a film having a basis weight of less than 40 g/m$^2$ and a density in the range of from 700 to 1000 kg/m$^3$.

* * * * *